(12) United States Patent
Zecherle et al.

(10) Patent No.: US 11,654,737 B2
(45) Date of Patent: May 23, 2023

(54) CONTROLLED PITCH OF A VEHICLE

(71) Applicant: AUDI AG, Ingolstadt (DE)

(72) Inventors: Andreas Zecherle, Walting (DE); Harald Hagen, Creußen (DE)

(73) Assignee: AUDI AG, Ingolstadt (DE)

( * ) Notice: Subject to any disclaimer, the term of this patent is extended or adjusted under 35 U.S.C. 154(b) by 296 days.

(21) Appl. No.: 16/895,313

(22) Filed: Jun. 8, 2020

(65) Prior Publication Data

US 2020/0398627 A1 Dec. 24, 2020

(30) Foreign Application Priority Data

Jun. 18, 2019 (DE) .......................... 102019208812.0

(51) Int. Cl.
*B60G 17/0165* (2006.01)
*B60G 17/00* (2006.01)

(52) U.S. Cl.
CPC ......... *B60G 17/0165* (2013.01); *B60G 17/00* (2013.01); *B60G 2202/40* (2013.01); *B60G 2400/0512* (2013.01); *B60G 2400/82* (2013.01); *B60G 2500/30* (2013.01)

(58) Field of Classification Search
CPC ............... B60G 17/00; B60G 17/0165; B60G 17/01908; B60G 2202/40; B60G 2204/81; B60G 2400/0512; B60G 2400/82; B60G 2400/824; B60G 2500/30; B60G 2800/014; B60G 2800/019; B60G 2800/0192

See application file for complete search history.

(56) References Cited

U.S. PATENT DOCUMENTS

| 6,714,851 | B2 * | 3/2004 | Hrovat | B60R 16/0233 340/440 |
| 6,718,248 | B2 * | 4/2004 | Lu | B62D 7/159 340/440 |
| 7,195,250 | B2 * | 3/2007 | Knox | G01C 7/04 280/5.518 |
| 7,210,551 | B2 * | 5/2007 | Krause | B60G 17/0165 280/6.154 |
| 7,590,474 | B2 * | 9/2009 | Fischer | B60G 17/0165 701/72 |
| 9,963,007 | B2 * | 5/2018 | Unger | B60G 17/0195 |
| 10,246,149 | B2 * | 4/2019 | Schindler | B60G 17/025 |
| 10,471,795 | B2 * | 11/2019 | Unger | B60G 17/01908 |

(Continued)

FOREIGN PATENT DOCUMENTS

| DE | 102013016888 A1 | 7/2014 |
| DE | 102014012841 A1 | 3/2016 |

(Continued)

OTHER PUBLICATIONS

German Search Report dated Feb. 19, 2020 in corresponding German Application No. 10 2019 208 812.0; 16 pages; Machine translation attached.

(Continued)

*Primary Examiner* — Laura Freedman
(74) *Attorney, Agent, or Firm* — Maier & Maier, PLLC

(57) ABSTRACT

A method for controlling a pitch of a vehicle, in which a control unit of a vehicle controls actuators of a suspension of a vehicle, which set a pitch of the vehicle, in dependence on a slope of a roadway section of a route of the vehicle and also a control unit and a vehicle.

14 Claims, 1 Drawing Sheet

(56) References Cited

U.S. PATENT DOCUMENTS

| | | | |
|---|---|---|---|
| 11,002,539 B2* | 5/2021 | Unger | B60W 40/076 |
| 11,214,196 B1* | 1/2022 | Hadir | B60R 1/28 |
| 2006/0138733 A1* | 6/2006 | Clauson | B60G 17/016 |
| | | | 280/5.514 |
| 2020/0231016 A1* | 7/2020 | Vente | B60G 17/0165 |

FOREIGN PATENT DOCUMENTS

| | | |
|---|---|---|
| DE | 102016217698 A1 | 3/2018 |
| EP | 3261862 B1 | 10/2018 |

OTHER PUBLICATIONS

German Examination Report dated May 6, 2021, in connection with corresponding DE Application No. 10 2019 208 812.0 (7 pp., including machine-generated English translation).

German Examination Report dated Sep. 7, 2021, in connection with corresponding DE Application No. 10 2019 208 812.0 (5 pp., including machine-generated English translation).

\* cited by examiner

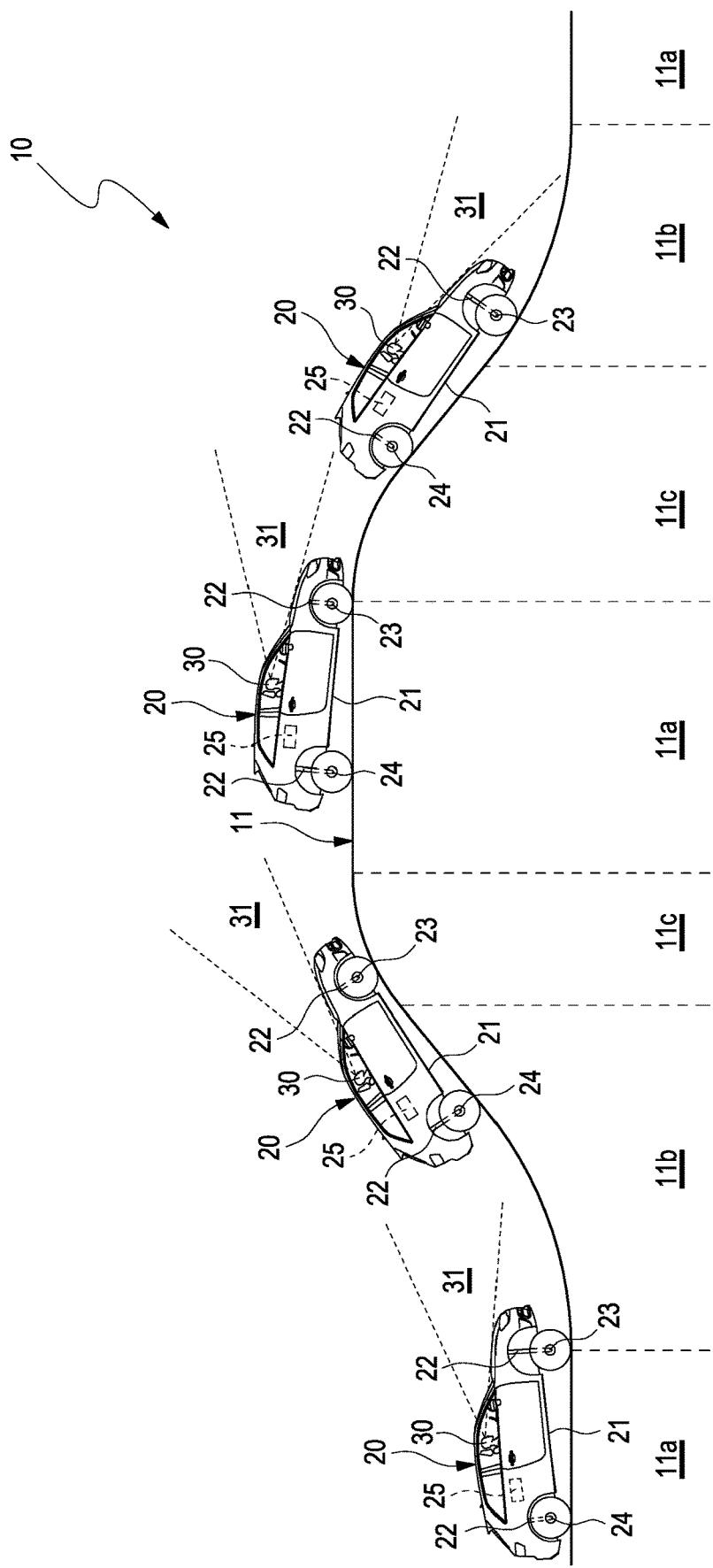

CONTROLLED PITCH OF A VEHICLE

FIELD

The disclosure relates to a method for controlling a pitch of a vehicle, in which a control unit of a vehicle controls actuators of a suspension of a vehicle, which set a pitch of the vehicle, in dependence on a slope of a roadway section of a route of the vehicle. The disclosure furthermore relates to a control unit and a vehicle.

BACKGROUND

Vehicles comprise a chassis and a plurality of wheels held on the chassis, which are in frictional contact with a roadway during intended use of the vehicle. The typically four wheels and actuators associated with the wheels, which connect the wheels to the chassis and set a distance of the wheels from the chassis, form a so-called active suspension of the vehicle.

The suspension is configured to set an inclination of the chassis and thus of a body of the vehicle rigidly connected to the chassis, which comprises a passenger compartment for occupants of the vehicle, in relation to the roadway. Relevant inclinations of the chassis in this regard include a pitch, which corresponds to an inclination of the vehicle around a horizontal axis extending perpendicularly to a front-rear direction of the vehicle, and a roll, which corresponds to an inclination of the vehicle around a horizontal axis extending in the front-rear direction of the vehicle. The purpose and the manner of an adjustment of the inclination can be different.

Thus, EP 3 261 862 B1 discloses a method for compensating for an inclination of a vehicle while driving on a roadway. In the method, an inclination of a chassis of the vehicle is ascertained with the aid of sensorially detected different distances of wheels of the vehicle to the chassis. Inclination angles of the roadway are determined from a difference of the inclination of the chassis and in inclination of a suspension of the vehicle. Adjustment lengths for actuators, which set the distances of the wheels to the chassis, are calculated in consideration of transmission ratios of the actuators from predetermined limiting values of the inclination angles of the roadway and the detected distances. The actuators are adjusted by the calculated adjustment lengths to compensate for an inclination of the vehicle.

While the above method is oriented toward dynamic conditions while the vehicle is being driven, the inclination of the vehicle is also of interest in static conditions during a standstill of the vehicle or substantially uniform driving of the vehicle.

DE 10 2014 012 841 A1 discloses a method for controlling an inclination of a vehicle, in which an inclination angle of the vehicle is detected and actuators of a suspension of the vehicle are controlled in dependence on the detected inclination angle to reduce or eliminate an inclination of the vehicle in relation to a horizontal plane. A vehicle having such a suspension control offers improved comfort for occupants of the vehicle during entry into or exit out of the vehicle and also while the vehicle is being driven.

A field of vision of a driver of the vehicle arranged in the vehicle is also dependent on an inclination of the vehicle. The field of vision of the driver is bounded because of the design in particular in a vertical direction, i.e., in a plane defined by the chassis in parallel thereto, by an upper edge of a windshield of the vehicle, on the one hand, and by a lower edge of the windshield or at least a front region of a hood of the vehicle, on the other hand. The pitch of the vehicle can thus directly influence the vertically bounded field of vision of the driver.

On the one hand, for example, increasingly ascending roadway sections in conjunction with the vertical field of vision bounding can obstruct a sufficient visual range of the driver. On the other hand, for example, roadway hilltops can interact unfavorably with the vertical field of vision bounding in such a way that the roadway is arranged outside, i.e., below, the field of vision of the driver. In this way, the vertical field of vision bounding and the roadway can increase a risk of accident of the vehicle.

SUMMARY

The invention is therefore based on the object of proposing an improved method for controlling a pitch of a vehicle, which adapts a field of vision of a driver of the vehicle in a vertical direction, in order to reduce a risk of accident of the vehicle. Furthermore, it is an object of the invention to provide a control unit for controlling a pitch of a vehicle and a vehicle.

One subject matter of the invention is a method for controlling a pitch of a vehicle, in which, while a vehicle is driving on a route, a control unit of the vehicle determines a slope of a roadway section of the route and controls actuators of a suspension of the vehicle, which set a pitch of the vehicle, in dependence on the determined slope. As is typical, the vehicle comprises a plurality of wheels, usually four wheels, which each in pairs form a front axle and a rear axle spaced apart from the front axle, a plurality of actuators, on which the wheels are held, and a control unit, which controls the actuators to set an inclination, in particular a pitch, of the vehicle. The wheels, the actuators, and the control unit are part of an active suspension of the vehicle.

In terms of the invention and as is typical in mathematics, the slope can have both a positive sign and also a negative sign. In the case of a positive slope of the roadway section, the roadway rises, while the roadway falls in the case of a negative slope of the roadway section, which is also called a downward slope. In other words, the vehicle gains height in a roadway section having positive slope, while it loses height in a roadway section having negative slope.

In the method according to the invention, the control unit determines a slope profile of an upcoming roadway section and controls the actuators predictively in dependence on the determined slope profile. For example, the control unit can determine the slope profile of the roadway section with the aid of sensor data, which are provided by environmental sensors of the vehicle, or with the aid of navigation data, which are provided by a navigation system of the vehicle. This enables the control unit to predictively control the actuators. In other words, the control of the actuators is not performed in dependence on a slope of a roadway section on which the vehicle is arranged, but rather in dependence on a slope profile of a roadway section which the vehicle is heading for, i.e., only reaches in a further course of the travel.

The slope profile in the meaning of the invention describes the dependence of the slope on the route along the roadway i.e., a function of the slope of a position on the roadway along the route is to be understood as the slope profile.

In this manner, the pitch of the vehicle can be predictively adapted to a roadway profile arranged ahead of the vehicle, in order to enable a field of vision for a driver of the vehicle, the design-related vertical bounding of which by a windshield or a hood of the vehicle interacts optimally with a roadway profile.

In one embodiment, the actuators increase a distance of a front axle of the vehicle from a chassis of the vehicle in relation to a distance of a rear axle of the vehicle from the chassis if the upcoming roadway section has an increasing slope. In short, the vehicle pitches to the rear by means of an action of the front axle to permit the driver a more far-reaching forward view of the roadway.

An increase of the slope means the roadway becomes steeper in the case of a slope having a positive sign and the roadway becomes flatter in the case of a slope having a negative sign.

In a further embodiment, the actuators reduce a distance of a rear axle of the vehicle from a chassis of the vehicle in relation to a distance of a front axle of the vehicle from the chassis if the upcoming roadway section has an increasing slope. The vehicle pitches to the rear by means of an action of the rear axle here, to enable a more far-reaching forward view of the roadway for the driver. This and the preceding variant can be used alternatively or in combination, depending on the current pitch of the vehicle before setting of the actuators.

In still a further embodiment, the actuators reduce a distance of a front axle of the vehicle from a chassis of the vehicle in relation to a distance of a rear axle of the vehicle from the chassis if the upcoming roadway section has a decreasing slope. The vehicle thus pitches to the front by means of an action of the front axle, in order to shift the roadway in the field of vision of the driver.

A reduction of the slope means the roadway becomes flatter in the case of a slope having a positive sign and the roadway becomes steeper in the case of a slope having a negative sign.

In other embodiments, the actuators increase a distance of a rear axle of the vehicle from a chassis of the vehicle in relation to a distance of a front axle of the vehicle from the chassis if the upcoming roadway section has a decreasing slope. The vehicle pitches to the front by means of an action of the rear axle here in order to shift the roadway in the field of vision of the driver. This and the preceding variant can be used alternatively or in combination, depending on the current pitch of the vehicle before setting of the actuators.

In still other embodiments, the actuators equalize a distance of a front axle of the vehicle from a chassis of a vehicle and a distance of a rear axle of the vehicle from the chassis to one another if the upcoming roadway section has a constant slope. The equalizing of the two distances can be performed by an action of the rear axle and also by an action of the front axle, depending on the current position of the actuators. In this position of the actuators, the chassis of the vehicle extends essentially in parallel to the upcoming roadway section.

Of course, all of the five preceding ways of setting the actuators of the chassis to control the pitch of the vehicle can be combined with one another depending on the situation and roadway.

The actuators preferably set a difference between the distance of the front axle from the chassis and the distance of the rear axle from the chassis in dependence on a change of the slope. This allows a particularly fine adaptation of the pitch of the vehicle to the respective roadway section arranged ahead of the vehicle.

The difference is advantageously increased if the change of the slope increases, and the difference is reduced if the change of the slope decreases. The difference thus follows the slope profile of the respective roadway section located ahead of the vehicle in real time.

The subject matter of the invention is also a control unit for a vehicle for controlling a pitch of the vehicle, which is configured to predictively control actuators of a suspension of the vehicle, which set a pitch of the vehicle, in dependence on a determined slope profile of an upcoming roadway section of a route of the vehicle or to execute a method according to the invention. The control unit can be a control unit of an existing active suspension present in the vehicle, which is configured by means of corresponding additional or modified program code for predictive control of the pitch of the vehicle.

A further subject matter of the invention is a vehicle which comprises a suspension having actuators, which set a pitch of the vehicle, and a control unit connected to the actuators, which is configured to predictively control the actuators in dependence on a determined slope profile of an upcoming roadway section of a route of the vehicle, or comprises a control unit according to the invention. The vehicle offers a driver a field of vision adapted to a slope profile of a roadway in a vertical direction.

One significant advantage of the invention is that a risk of accident of the vehicle is reduced thanks to an optimum interaction of a vertically bounded field of vision of a driver of the vehicle with a roadway. A further advantage is that a control unit of an active suspension can be configured easily and cost-effectively for the control method according to the invention by means of a program code.

BRIEF DESCRIPTION OF THE DRAWINGS

The disclosure is schematically illustrated in the drawings with the aid of embodiments and is described further with reference to the drawings. In the FIGURE:

FIG. 1 shows a schematic illustration of a side view of a route and a vehicle according to one embodiment of the invention while driving on the route.

DETAILED DESCRIPTION

FIG. 1 shows a schematic illustration of a side view of a route 10 and a vehicle 20 according to one embodiment of the invention at various points while driving on the route 10. A roadway 11 along the route 10 has a plurality of adjacent roadway sections 11a, 11b, 11c.

The roadway sections 11a have a constant slope, wherein they are each shown as flat roadway sections in the FIGURE. However, those roadway sections (not shown here) which rise or fall without changing the slope would also be identified by the reference sign 11a.

The roadway sections 11b have an increasing slope, wherein the roadway section 11b shown on the left has a rise of the roadway which is becoming steeper and the roadway section 11b shown on the right has a drop of the roadway which is becoming flatter.

The roadway sections 11c have a decreasing slope, wherein the roadway section 11c shown on the left has a rise of the roadway which is becoming flatter and the roadway section 11c shown on the right has a drop of the roadway which is becoming steeper.

The vehicle 20 comprises a suspension having a chassis 21, at least four actuators 22, which are fastened on the chassis 21 and set a pitch of the vehicle 20, and four wheels, which are each held on one actuator 22 and in pairs form a front axle 23 and a rear axle 24 of the vehicle 20. The vehicle 20 furthermore comprises a control unit 25, which is connected to the actuators 22 and sensors (not shown) and/or a navigation system (not shown) of the vehicle 20, which provide environmental data of a front environment of the vehicle 20 and/or navigation data for the control unit 25.

In the vehicle 20, a driver 30, who has a field of vision 31, is arranged on a driver seat. The field of vision 31 is bounded at the top and bottom in a vertical direction by a windshield and/or a hood of the vehicle 20 because of the design.

The control unit 25 is configured to determine a slope profile of an upcoming roadway section 11a, 11b, 11c of the route 10 from the provided environmental data and/or navigation data and to predictively control the actuators 22 setting the pitch of the vehicle 20 in dependence on the determined slope profile.

While the vehicle 20 is driving on the route 10, the control unit 25 determines a respective slope profile of an upcoming roadway section 11a, 11b, 11c and predictively controls the actuators 22 adjusting the pitch of the vehicle 20 in dependence on the determined slope profile.

Thanks to the control by the control unit 25, the actuators 22 increase a distance of the front axle 23 from the chassis 21 in relation to a distance of the rear axle 24 from the chassis 21 if the upcoming roadway section 11b has an increasing slope. With a similar effect for the field of vision 31 of the driver 30, the actuators 22 reduce the distance of the rear axle 24 from the chassis 21 in relation to a distance of the front axle 23 from the chassis 21 if the upcoming roadway section 11b has an increasing slope.

The actuators 22 also reduce the distance of the front axle 23 from the chassis 21 in relation to the distance of the rear axle 24 from the chassis 21 if the upcoming roadway section 11c has a decreasing slope. With a similar effect for the field of vision 31 of the driver 30, the actuators 22 increase the distance of the rear axle 24 from the chassis 21 in relation to a distance of the front axle 23 from the chassis 21 if the upcoming roadway section 11c has a decreasing slope.

Furthermore, the actuators 22 equalize the distance of the front axle 23 from the chassis 21 and the distance of the rear axle 24 from the chassis 21 if the upcoming roadway section 11a has a constant slope.

The actuators 22 always set a difference between the distance of the front axle 23 from the chassis 21 and the distance of the rear axle 24 from the chassis 21 in dependence on a change of the slope, wherein the difference is increased if the change of the slope increases and the difference is reduced if the change of the slope decreases.

The vehicle 20 is shown at four different positions of the route 10, each having differently adjusted actuators 22 while driving from left to right.

At the first position, the vehicle 20 is located on a roadway section 11a having a constant slope. The distance of the front axle 23 to the chassis 21 is increased in relation to the distance of the rear axle 24, i.e., the vehicle 20 pitches to the rear, since a roadway section 11b having an increasing slope is located ahead of the vehicle 20, which follows the roadway section 11a along the route 10.

At the second point, the vehicle 20 is located before a roadway section 11c having a decreasing slope. The distance of the rear axle 24 to the chassis 21 is increased in relation to the distance of the front axle 23, i.e., the vehicle 20 pitches to the front, since a roadway section 11c having a decreasing slope is ahead of the vehicle 20 along the route 10.

At the third position, the vehicle is located on a roadway section 11a having a constant slope. The distance of the rear axle 24 to the chassis 21 is increased in relation to the distance of the front axle 23, i.e., the vehicle 20 pitches to the front, since a roadway section 11c having a decreasing slope is located ahead of the vehicle 20, which follows the roadway section 11a along the route 10.

At the fourth position, the vehicle is located before a roadway section 11b having an increasing slope. The distance of the front axle 23 from the chassis 21 is increased in relation to the distance of the rear axle 24, i.e., the vehicle 20 pitches to the rear, since a roadway section 11b having an increasing slope is located ahead of the vehicle 20 along the route 10.

In other words, the control unit 25 controls the actuators 22 in such a way that the vehicle 20 pitches to the front before a convex roadway section 11b and pitches to the rear before a concave roadway section 11c, wherein a strength of the pitch of the vehicle 20 is adjusted in dependence on a strength of the convexity or concavity, respectively, of a roadway section 11a, 11b, 11c located ahead of the vehicle 20.

The invention claimed is:

1. A method for controlling a pitch of a vehicle, comprising:
    determining, via a control unit of the vehicle, while the vehicle is driving on a route, a slope profile comprising a mathematical function indicating a strength of a concavity or convexity and a change in a slope with respect to a position of an upcoming roadway section of the route which the vehicle is heading towards; and
    predictively controlling actuators of a suspension of the vehicle, to set the pitch of the vehicle in dependence on the determined slope profile, wherein the actuators increase a distance between a front axle of the vehicle and a chassis of the vehicle in relation to a distance between a rear axle and the chassis if the slope profile indicates that the slope of the upcoming roadway section which the vehicle is heading towards is increasing and negative.

2. The method as claimed in claim 1, wherein the actuators reduce the distance of the rear axle of the vehicle from the chassis of the vehicle in relation to the distance of the front axle of the vehicle from the chassis if the upcoming roadway section has an increasing slope.

3. The method as claimed in claim 2, wherein the actuators reduce the distance of the front axle of the vehicle from the chassis of the vehicle in relation to the distance of the rear axle of the vehicle from the chassis if the upcoming roadway section has a decreasing slope.

4. The method as claimed in claim 2, wherein the actuators increase the distance of the rear axle of the vehicle from the chassis of the vehicle in relation to the distance of the front axle of the vehicle from the chassis if the upcoming roadway section has a decreasing slope.

5. The method as claimed in claim 2, wherein the actuators equalize the distance of the front axle of the vehicle from the chassis of the vehicle and the distance of the rear axle of the vehicle from the chassis to one another if the upcoming roadway section has a constant slope.

6. The method as claimed in claim 1, wherein the actuators reduce the distance of the front axle of the vehicle from the chassis of the vehicle in relation to the distance of the rear axle of the vehicle from the chassis if the upcoming roadway section has a decreasing slope.

7. The method as claimed in claim 6, wherein the actuators increase the distance of the rear axle of the vehicle from the chassis of the vehicle in relation to the distance of the front axle of the vehicle from the chassis if the upcoming roadway section has a decreasing slope.

8. The method as claimed in claim 6, wherein the actuators equalize the distance of the front axle of the vehicle from the chassis of the vehicle and the distance of the rear axle of the vehicle from the chassis to one another if the upcoming roadway section has a constant slope.

9. The method as claimed in claim 1, wherein the actuators increase the distance of the rear axle of the vehicle from the chassis of the vehicle in relation to the distance of the front axle of the vehicle from the chassis if the upcoming roadway section has a decreasing slope.

10. The method as claimed in claim 9, wherein the actuators equalize the distance of the front axle of the vehicle from the chassis of the vehicle and the distance of the rear axle of the vehicle from the chassis to one another if the upcoming roadway section has a constant slope.

11. The method as claimed in claim 1, wherein the actuators equalize the distance of the front axle of the vehicle from the chassis of the vehicle and the distance of the rear axle of the vehicle from the chassis to one another if the upcoming roadway section has a constant slope.

12. The method as claimed in claim 1, wherein the actuators set a difference between the distance of the front axle from the chassis and the distance of the rear axle from the chassis in dependence on a change of the slope.

13. The method as claimed in claim 12, wherein the difference is increased if the change of the slope increases, and the difference is reduced if the change of the slope decreases.

14. A system controlling a pitch of a vehicle comprising:
a control unit configured to predictively control actuators of a suspension of the vehicle, which set the pitch of the vehicle, in dependence on a determined slope profile comprising a mathematical function indicating a strength of a concavity or convexity and a change in a slope with respect to a position of an upcoming roadway section of a route which the vehicle is heading towards, wherein the actuators increase a distance between a front axle of the vehicle and a chassis of the vehicle in relation to a distance between a rear axle and the chassis if the slope profile indicates that the slope of the upcoming roadway is increasing.

* * * * *